(12) United States Patent
Hamedovic et al.

(10) Patent No.: US 9,670,864 B2
(45) Date of Patent: Jun. 6, 2017

(54) METHOD AND DEVICE FOR ACTUATING AN INJECTOR IN A FUEL INJECTION SYSTEM OF AN INTERNAL COMBUSTION ENGINE

(75) Inventors: Haris Hamedovic, Moeglingen (DE); Wolfgang Fischer, Gerlingen (DE); Silke Seuling, Remseck/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 1078 days.

(21) Appl. No.: 13/881,677

(22) PCT Filed: Sep. 30, 2011

(86) PCT No.: PCT/EP2011/067077
§ 371 (c)(1),
(2), (4) Date: Aug. 7, 2013

(87) PCT Pub. No.: WO2012/055667
PCT Pub. Date: May 3, 2012

(65) Prior Publication Data
US 2013/0306034 A1 Nov. 21, 2013

(30) Foreign Application Priority Data
Oct. 25, 2010 (DE) .................... 10 2010 042 853

(51) Int. Cl.
*F02D 41/30* (2006.01)
*F02D 41/22* (2006.01)
(Continued)

(52) U.S. Cl.
CPC ........... *F02D 41/30* (2013.01); *F02D 41/221* (2013.01); *F02D 41/2467* (2013.01);
(Continued)

(58) Field of Classification Search
CPC ............... Y02T 10/123; F02B 27/0294; F02D 41/2429; F02D 41/2432; F02D 41/2451;
(Continued)

(56) References Cited

U.S. PATENT DOCUMENTS

| 4,903,669 A | * | 2/1990 | Groff | ................ F02D 41/2403 |
| | | | | 123/478 |
| 6,085,142 A | * | 7/2000 | Di Leo | ............... F02D 41/1498 |
| | | | | 701/104 |

(Continued)

FOREIGN PATENT DOCUMENTS

| DE | 10 2005 032 087 | 1/2007 |
| DE | 10 2007 019 099 | 10/2008 |

(Continued)

OTHER PUBLICATIONS

International Search Report, International Application No. PCT/EP2011/067077, dated Dec. 13, 2011.

*Primary Examiner* — Joseph Dallo
*Assistant Examiner* — Anthony L Bacon
(74) *Attorney, Agent, or Firm* — Norton Rose Fulbright US LLP; Gerard Messina

(57) ABSTRACT

A device and a method for actuating an injector in a fuel-injection system of an internal combustion engine are described. Using a first calibration method and based on a control parameter, an injector parameter which characterizes the injection process is determined. Starting from this injector parameter, a first feature is determined for calibrating the injector. A second calibration method determines a second feature for calibrating the injector, based on an engine parameter. The first calibration method is monitored on the basis of the second feature.

7 Claims, 4 Drawing Sheets

(51) Int. Cl.
*F02D 41/24* (2006.01)
*H01F 7/18* (2006.01)
*F02D 41/20* (2006.01)

(52) U.S. Cl.
CPC ........... *H01F 7/1844* (2013.01); *F02D 41/20* (2013.01); *F02D 41/2096* (2013.01); *F02D 41/248* (2013.01); *Y02T 10/40* (2013.01)

(58) Field of Classification Search
CPC ............. F02D 41/2464; F02D 41/2467; F02D 41/247; F02D 2250/16; F02M 2200/8092
See application file for complete search history.

(56) References Cited

U.S. PATENT DOCUMENTS

| | | | |
|---|---|---|---|
| 6,189,378 B1 * | 2/2001 | Kendrick | F02D 41/2438 73/114.45 |
| 2002/0023622 A1 * | 2/2002 | Rueger | F02D 41/2096 123/490 |
| 2003/0080288 A1 | 5/2003 | Evans et al. | |
| 2009/0088953 A1 | 4/2009 | Mai et al. | |
| 2010/0116911 A1 | 5/2010 | Fritsch et al. | |

FOREIGN PATENT DOCUMENTS

| | | |
|---|---|---|
| DE | 10 2008 060 928 | 6/2010 |
| DE | 10 2009 009 270 | 8/2010 |
| DE | 10 2009 003 211 | 11/2010 |
| JP | 2002-371897 | 12/2002 |
| JP | 2003-206801 | 7/2003 |
| JP | 2006-328970 | 12/2006 |
| JP | 2007-224810 | 9/2007 |
| JP | 2008-215338 | 9/2008 |

* cited by examiner

METHOD AND DEVICE FOR ACTUATING AN INJECTOR IN A FUEL INJECTION SYSTEM OF AN INTERNAL COMBUSTION ENGINE

FIELD

The present invention is based on a device and a method for actuating an injector in a fuel injection system of an internal combustion engine.

BACKGROUND INFORMATION

One method for actuating an injector in a fuel injection system of an internal combustion engine is described in German Patent Application No. DE 10 2009 003 211. In the method and the device described, an injector quantity that characterizes the injection process is ascertained with the aid of a calibration method on the basis of a control variable. Then, starting from this injector parameter, a feature for calibrating the injector is determined.

Since such a calibration affects the injection of fuel and thereby indirectly causes a change in the exhaust-gas emissions, many countries require that this method be monitored to ensure its proper functioning.

SUMMARY

An example method and an example device according to the present invention may have the advantage that the proper functioning of the calibration method is able to be monitored in reliable manner.

It is especially advantageous that an injection parameter which characterizes the injection process is determined by a first calibration method on the basis of a control parameter, and this parameter is used to determine a first feature for calibrating the injector; and that a second calibration method is used to determine a second feature for calibrating the injector based on an engine parameter, and the first calibration method is monitored on the basis of the second feature. In other words, features which may be used for calibrating injectors are ascertained by two methods. This makes it possible to detect an error in one of the calibration methods.

In one first specific embodiment, a calibration is initially implemented using the first calibration method. The determined features are employed to correct the control. An error is detected if the second feature (M2) of the second calibration method is greater than a threshold value. In other words, if the second calibration method detects a need for further calibration following a calibration procedure with the aid of the first method, an error is detected. This simplifies the work in the second method because all that needs to be determined is whether a calibration is required. The features can be detected in a less complicated manner.

In a second specific embodiment, an error is detected if the two features deviate from each other by more than a threshold value. This means that an error is detected if the two calibration methods supply different values for the correction.

The control quantity preferably is the current flowing through the injector or the voltage applied at the injector. These quantities are easy to detect.

At least one of the quantities of closing instant, opening instant, closing duration, injection quantity, switching time, and/or lift-off instant of the injector are determined from the control quantity as injector quantity. These quantities characterize the injection process quite well and represent the injected fuel quantity very accurately.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

Figure 1:
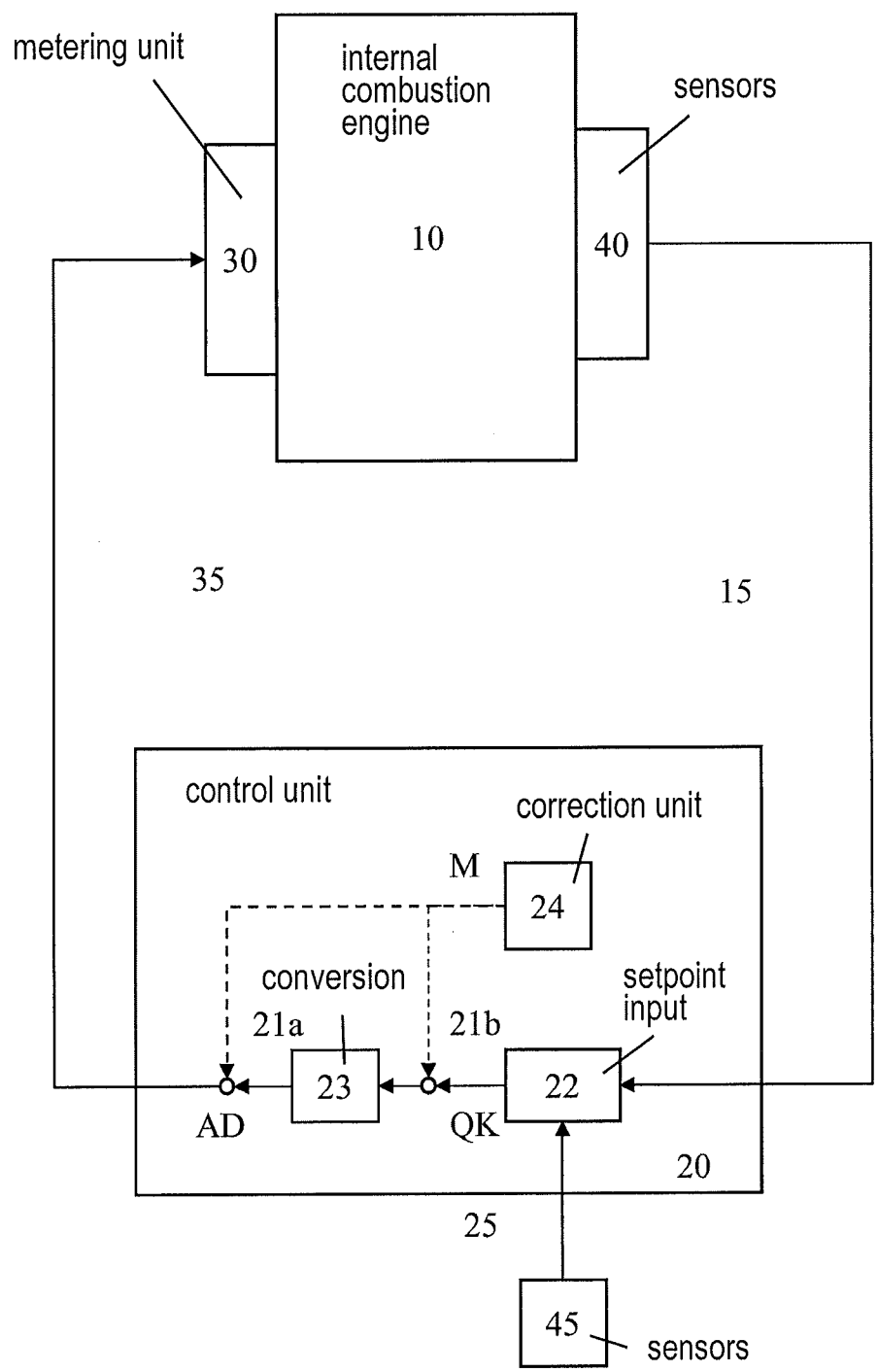
FIG. 1 shows main elements of a fuel metering system of an internal combustion engine.

FIG. 1 shows a block diagram of main elements of a fuel metering system of an internal combustion engine. A fuel metering unit 30 meters a specific fuel quantity to internal combustion engine 10 at a particular instant. Various sensors 40 detect measured values 15 which characterize the operating state of the internal combustion engine and forward them to a control unit 20. In addition, different output signals 25, additional sensors 45 are forwarded to control device 20. Acquired measured values 15 characterize the state of the internal combustion engine, such as the rotational speed of the internal combustion engine. Based on these measured values 15 and additional quantities 25, control device 20 calculates actuating pulses 35, which are applied at fuel metering unit 30. For this purpose the control device is provided with a setpoint input 22 and correction unit 24, in addition to other elements which are not shown.

The internal combustion engine preferably is an internal combustion engine having direct injection. In principle, however, the procedure is also usable in all internal combustion engines in which fuel is metered into the combustion chamber. Fuel metering unit 30 may have different configurations. It is preferred if the fuel metering system is developed as so-called common-rail system. In such a common-rail system the fuel is condensed by a high-pressure pump and supplied to a rail. Via injectors, the fuel then travels from this rail into the combustion chambers of the internal combustion engine. The injection period during which fuel is metered by the injectors is specified in the usual manner by a solenoid valve or a piezoactor. The control device actuates the solenoid valve or the piezo actor via an output stage, in such a way that it is connected to a supply voltage for a particular control period.

The control device calculates the fuel quantity to be injected into the internal combustion engine in the conventional manner. This calculation is performed as a function of different measured values 15, such as rotational speed N, the engine temperature, the actual start of injection, and additional quantities 25 characterizing the operating state of the vehicle. These additional quantities are, for example, the position of the accelerator pedal, which characterizes the driver's intentions, or the pressure and the temperature of the ambient air. This calculation of fuel quantity QK to be injected takes place in first setpoint input 22. The control unit then converts the fuel quantity to be injected into a corresponding control signal having a corresponding control period AD, which is then applied at the injectors. This takes place in conversion 23.

One problem in such fuel metering systems is that the electrically actuated valves or piezo actuators may meter different fuel quantities in response to an identical control signal, especially an identical control period.

For this reason calibration methods are provided, which, starting from specific quantities, determine a feature M, which is utilized to calibrate the injector.

Correction unit 24 includes such a calibration method. It supplies feature M as output signal. This feature M is used to correct injection quantity QK or control period AD. This may be done by adding value M to injection quantity QK or to control period AD in a node 21a or 21b. In other words, injection quantity QK is increased or reduced by value M, and the control period is extended or shortened by value M. As an alternative, a multiplicative correction may be provided as well.

For example, calibration methods are know in which specific injector quantities which characterize the injection process are determined on the basis of the current flowing through the injector. For instance, the closing instant at which the solenoid valve closes and at which the injection process therefore is concluded, the opening instant, at which the solenoid valve opens and the injection instant begins, the closing period, i.e., the time interval between closing instant and opening instant, are able to be determined by analyzing the current flowing through the injector. This may be accomplished, for example, by a change in the current or the voltage characteristic at these instants. However, in addition to these quantities, other variables may be analyzed as well, such as the lifting instant of the injector, i.e., the instant at which the needle begins to move. Starting from one or more of these quantities, a correction value is then calculated, with whose aid the control period is corrected in such a way that the individual injector meters the desired fuel quantity at the desired instant. This correction value is also used as feature.

Figure 2:
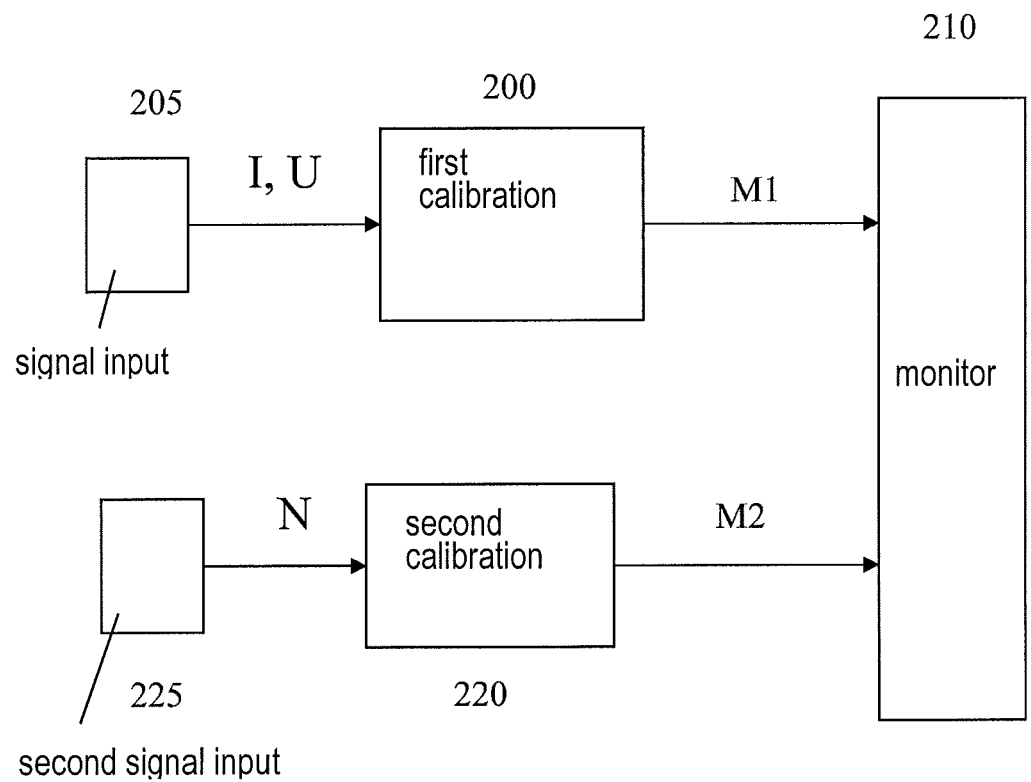
FIG. 2 shows main elements of an example device according to the present invention.

FIG. 2 shows a corresponding procedure. A first calibration method is denoted by 200. This calibration method calculates the correction value, a first feature M1, for calibrating the injector based on a control quantity. Control quantity I, U is provided by a signal input 205. The output signal of the first calibration, which is referred to as first feature M1 in the following text, is forwarded to a monitor 210. A second calibration is denoted by 220. It analyzes an engine quantity N, which is provided by a second signal input 225. This second calibration method 220 supplies a second feature M2, which likewise is analyzed by monitor 210.

Starting from a control quantity, first calibration method 200 calculates a first feature M1, which is used to calibrate the injector. This means that the first calibration method determines at least one injector quantity characterizing the injection process, for instance based on the current flowing through the injector, or on the basis of the voltage signal. These injector quantities are, for example, one or more quantities such as the injection quantity, closing instant, opening instant, closing period, switching instant and/or lift-off instant of the injector. One or more of these quantities is/are determined by analyzing the current flowing through the injector, or by analyzing the voltage applied at the injector. For example, it may be provided that, based on the derivation of the current or the voltage, the opening instant or the closing instant of the solenoid valve of the injector is detected. Preferably, both the closing and the opening instants are detected and the closing period of the solenoid valve is determined in this manner.

In one further development, the feature for calibrating the injector is determined based on the injector quantity characterizing the injection process. For example, it may be provided to compare the closing period with an expected value, i.e., a setpoint value, in which case a corresponding correction of the control period takes place if a deviation has occurred. This means that the closing period is controlled to a setpoint value, and that the control quantity by which the injector is actuated is used as control variable. In this case the control variable of the controller is used as first feature M1.

In one alternative development it may be provided that the closing periods of the individual injectors are compared to each other. The deviation from the average value is then used as first feature M1.

In one development it may also be provided that, starting from the current characteristic or the voltage characteristic, an injector quantity such as the closing period of the solenoid valve or the injector, is determined directly. This injector quantity serves as a direct measure for the injected fuel quantity. Using the injector quantity as the basis, a correction value is then calculated, which is employed to correct the control period or another variable characterizing the control period, in such a way that the injector quantity assumes the expected value. Then, this correction value is stored and used for the correction. This correction value serves as first feature M1.

The first calibration method is also called a current-based calibration method. As an alternative to the current evaluation, it is also possible to analyze the voltage signal appropriately.

Second calibration method 220 preferably is designed as rpm-based calibration method. This method calibrates a torque of the individual cylinder based on rotational speed N, which is supplied by second signal input 225. In one first development, a switch between different injection patterns is then provided, i.e., the entire control period is kept constant and the full fuel quantity is metered to the internal combustion engine in alternation using a partial injection or, alternatively, two or more partial injections. For example, a switch may take place between an operation featuring a pre-injection and an operation without pre-injection. If the injectors meter the same fuel quantity in response to the same control signal, no change will occur in the torque in the switchover, and thus no change in the rotational speed either. If a deviation occurs, then a correction value is calculated based on this deviation, which value is calculated in such a way that the torque or the rotational speed remains constant in the switchover. This correction value serves as second feature M2.

According to the example embodiment of the present invention, it is then provided that the monitoring with the aid of the second calibration method monitors the first calibration method for proper functioning.

Figure 3:
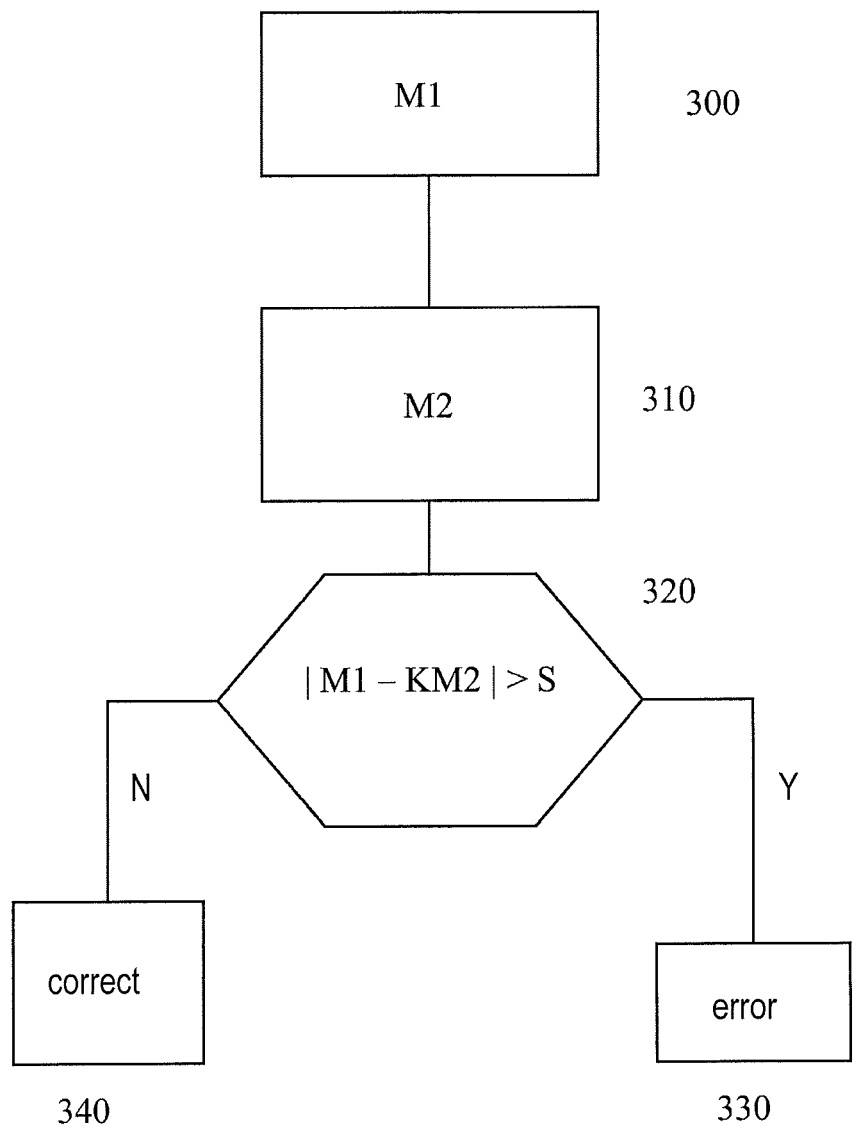
FIGS. 3 and 4 show a specific embodiment of the procedure according to the present invention.

One first specific development featuring such monitoring is shown in FIG. 3. In a first step 300, the first calibration method is executed and a first correction value is calculated, which is to be used when correcting the actuation of the injector. This first feature M1 characterizes the deviation of the control period from an optimal value. This optimal value corresponds to the value normally required in order to inject the desired fuel quantity. This first feature M1 is determined by correction unit 24. However, no correction of control pulses 35 takes place.

In a second step 310, a second feature M2 is calculated by means of the second calibration method. In a third step 320, the difference between the two features M1−M2 is calculated. If these features deviate from each other by more than a threshold value S, an error will be detected in step 330. If no deviation is recorded, correct operation is detected in step 340.

It is preferred if only the absolute value of the difference of the two features M1 and M2 is compared to a threshold value S. In other words, an error is detected if the two features calculated by means of the two calibration methods deviate from each other by more than a threshold value.

Figure 4:
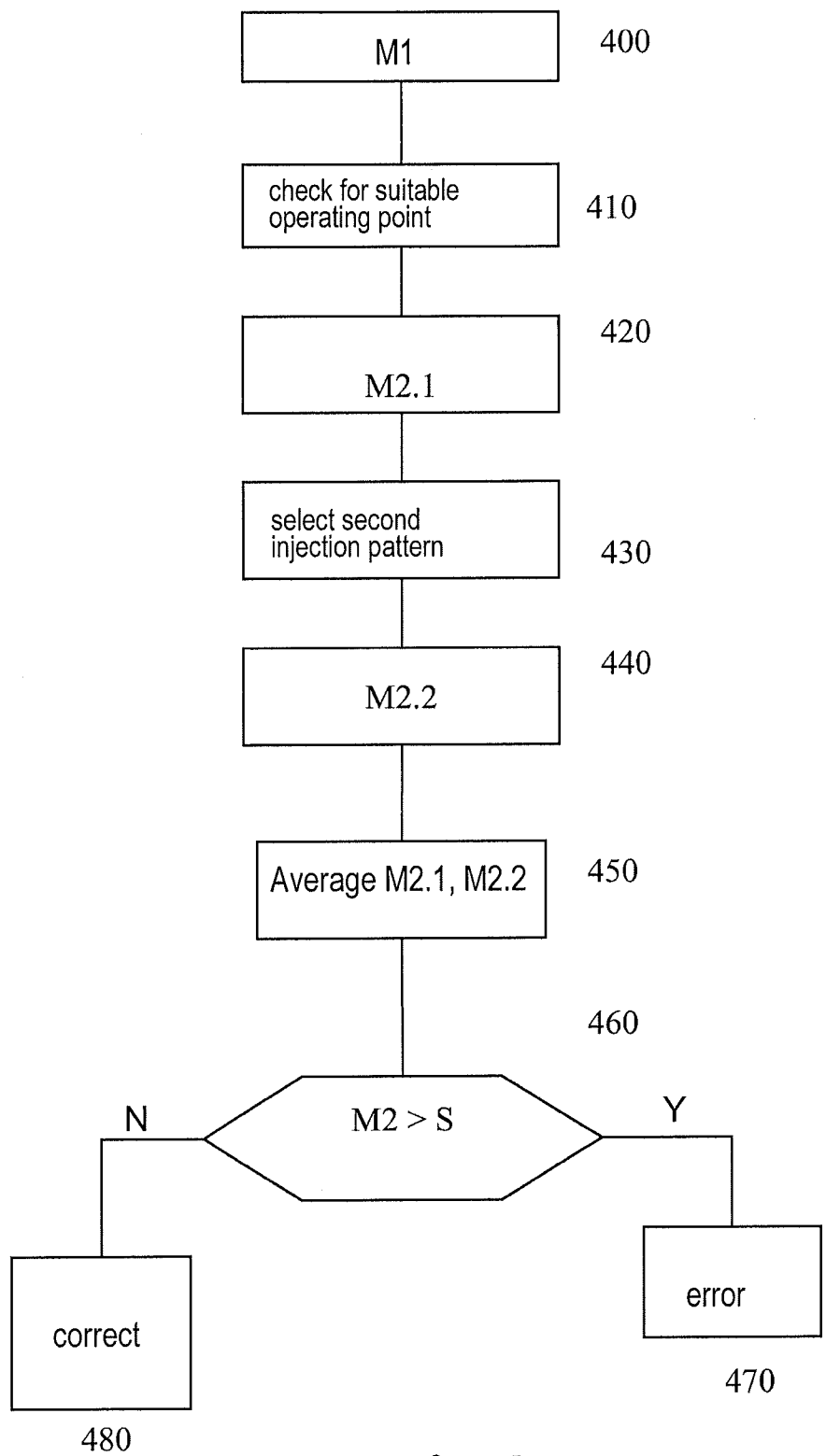

A second specific embodiment is shown in FIG. 4. This specific embodiment provides that the main function, i.e., the first calibration method, calibrates using the selected operating point, which the actuation signal and thus the injected fuel quantity. For the diagnosis, a single injection and multiple injections is/are then delivered in alternation, using the actuation periods learned by the main function. This is done in an advantageous operating point, e.g., at lower rotational speed, no climate-control system operating, for a particular number of working cycles. The rotational-speed signal is used to calculate second feature M2 for each combustion. Then the difference between the feature of the single and multiple injections is formed and averaged across a particular number of working cycles. If this difference exceeds a specific applicable threshold, a faulty main calibration function will be detected.

This procedure is shown in greater detail in FIG. 4. In a first step 400, the first calibration method is executed and first feature M1 is calculated and used to correct actuation signal 35. In step 410, it is checked whether a suitable operating point for the diagnosis is at hand. Such suitable operating points in particular are operating points featuring a low rotational speed, during which additional consumers such as a climate-control system are switched off. Then, in a step 420, a first value M2.1 is calculated for the second feature. In step 430, a second injection pattern is selected. This second injection pattern, in particular, provides for an injection which is split into multiple partial injections. Next, in a step 440, a second value M2.2 is determined for the second feature. In step 450, the first and second values of the second feature are averaged. In other words, an average value is determined across multiple measured values of the first value and the second value of the second feature. In a simplified form, this averaging may also be omitted.

In the subsequent query 460, it is checked whether second feature M2, especially the averaged second feature, is greater than a threshold value S. If this is the case, an error is detected in step 470, and if this is not the case, correct operation is detected in 480.

In accordance with the present invention, the control signals are therefore corrected using the first calibration method. To control the method of functioning of the first calibration method, correction values are determined by means of a second calibration method. If the second calibration method detects a need for further corrections, an error in the range of the first calibration method will be detected.

According to the present invention it is provided, that by means of the second calibration method it is not implemented completely but it is merely monitored whether a signal exhibits essential changes in the transition from multiple injections to a single injection, that is to say, in this method it is sufficient as feature to consider only the rotational speed signal or the torque and to check whether it changes in a switch between multiple and single injection(s). It may also be provided that the switch does not take place between single and multiple injection(s); instead, a switch occurs between two multiple injections having a different number of multiple injections, i.e., in general, two feature values are determined at different injection patterns. If these features deviate from each other, then an error is determined in the first calibration method. In this specific embodiment, a signal which characterizes the torque supplied or output by the internal combustion engine serves as second feature. For example, the directly measured or calculated rotational speed signal may be used. As an alternative, it is also possible to use as second feature a quantity that is calculated on the basis of at least the rotational speed signal.

Both specific embodiments have in common that a current-based calibration method is monitored using a rotational-speed-based calibration method. Since the two methods are based on different input variables, there is a very high probability that errors will be detected.

What is claimed is:

1. A method for actuating an injector of a fuel injection system of an internal combustion engine, comprising:
    determining an injector parameter which characterizes an injection process using a first calibration method based on a control parameter, and determining a first feature for calibrating the injector based on the determined injector parameter;
    determining a second feature for calibrating the injector using a second calibration method based on an engine parameter, and monitoring the first calibration method based on the second feature; and
    activating the injector in accordance with a control signal that is evaluated based on the first feature and the second feature.

2. The method as recited in claim 1, further comprising:
    after a calibration has taken place using the first calibration, detecting an error if the second feature of the second calibration method is greater than a threshold value.

3. The method as recited in claim 2, wherein the second feature characterizes supplied torque.

4. The method as recited in claim 1, further comprising:
    detecting an error if the first and second features deviate from each other by more than a threshold value.

5. The method as recited in claim 1, wherein the control parameter is based on one of current flowing through the injector or voltage applied at the injector.

6. The method as recited in claim 1, wherein the first feature is at least one of injection quantity, closing instant, opening instant, closing duration, switching instant, and lift-off instant of the injector.

7. A device for actuating an injector in a fuel-injection system of an internal combustion engine, comprising:
    a unit to determine an injector parameter that characterizes an injection process using a first calibration method based on a control parameter, to determine a first feature for calibrating the injector based on the parameter, to determine a second feature for calibrating the injector based on an engine parameter using a second calibration method, and to monitor the first calibration method based on the second feature; and
    a unit to activate the injector in accordance with a control signal that is evaluated based on the first feature and the second feature.

* * * * *